United States Patent
McCorkendale et al.

(10) Patent No.: US 7,685,639 B1
(45) Date of Patent: Mar. 23, 2010

(54) USING INSERTED E-MAIL HEADERS TO ENFORCE A SECURITY POLICY

(75) Inventors: Bruce McCorkendale, Manhattan Beach, CA (US); William E. Sobel, Stevenson Ranch, CA (US); Carey Nachenberg, Northridge, CA (US); Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1198 days.

(21) Appl. No.: 10/881,194

(22) Filed: Jun. 29, 2004

(51) Int. Cl.
*G06F 17/00* (2006.01)
*G06F 11/00* (2006.01)
*G06F 15/16* (2006.01)
*G06F 15/173* (2006.01)
*H04L 9/10* (2006.01)
*H04L 9/08* (2006.01)
*H04L 9/32* (2006.01)
*G06F 13/00* (2006.01)

(52) U.S. Cl. ............... 726/24; 726/1; 726/22; 709/206; 709/224

(58) Field of Classification Search ............ 726/1, 726/24; 709/224, 206
See application file for complete search history.

(56) References Cited

U.S. PATENT DOCUMENTS

| | | | |
|---|---|---|---|
| 5,850,499 A * | 12/1998 | Sasaki et al. ............... 385/135 | |
| 6,088,803 A | 7/2000 | Tso et al. | |
| 6,314,409 B2 | 11/2001 | Schneck | |
| 6,928,553 B2 | 8/2005 | Xiong et al. | |
| 7,127,741 B2 * | 10/2006 | Bandini et al. ............... 726/14 | |
| 2002/0083343 A1 | 6/2002 | Crosbie | |
| 2002/0087882 A1 | 7/2002 | Schneier et al. | |
| 2002/0157020 A1 | 10/2002 | Royer | |
| 2003/0037251 A1 | 2/2003 | Frieder | |
| 2003/0051026 A1 | 3/2003 | Carter et al. | |
| 2003/0097409 A1 * | 5/2003 | Tsai ........................... 713/201 | |
| 2003/0167402 A1 * | 9/2003 | Stolfo et al. ............... 713/200 | |
| 2005/0015626 A1 * | 1/2005 | Chasin ....................... 713/201 | |
| 2005/0108351 A1 * | 5/2005 | Naick et al. ............... 709/207 | |

(Continued)

FOREIGN PATENT DOCUMENTS

DE 10204613 A1 * 8/2003

(Continued)

OTHER PUBLICATIONS

Christopher Kruegel, Giovanni Vigna, "Anomaly detection of web-based attacks", Oct. 2003, CCS '03: Proceedings of the 10th ACM conference on Computer and communications security, Publisher: ACM, pp. 251-261.*

(Continued)

*Primary Examiner*—Matthew B Smithers
*Assistant Examiner*—Courtney D Fields
(74) *Attorney, Agent, or Firm*—Fenwick & West LLP

(57) ABSTRACT

An outgoing e-mail manager inserts headers into outgoing e-mail messages originating from at least one source on a computer. Each header includes data concerning the source of the e-mail. An e-mail header manager monitors an e-mail stream, and reads headers inserted into e-mail messages. The e-mail header manager applies a security policy to e-mail messages, responsive to the contents of the inserted headers.

35 Claims, 3 Drawing Sheets

U.S. PATENT DOCUMENTS

2006/0068755 A1* 3/2006 Shraim et al. ............... 455/410

FOREIGN PATENT DOCUMENTS

WO          WO 01/71499 A1     9/2001

OTHER PUBLICATIONS

Lee, Sin Yeung; Low, Wai Lup and Wong, Pei Yuen, "Learning Fingerprints for a Database Intrusion Detection System", Computer Security Laboratory,. DSO National Labortories, Singapore, ESORICS Nov. 2002, LNCS 2502, pp. 264-279.

Low, Wai Lup, et al., "DIDAFIT: Detecting Intrusions In Databases Through Fingerprinting Transactions," ICEIS 2002, Fourth International Conference On Enterprise Information Systems, vol. 1, Apr. 3-6, 2002, pp. 121-128, Ciudad Real, Spain.

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>.

AirCERT web page, last updated Sep. 18, 2000 [online]. Cert.org [retrieved Apr. 18, 2003]. Retrieved from the Internet: <URL: http://www.cert.org/kb/aircert/>.

Analysis Console For Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd%241%40nnrp1.deja.com&oe=UTF-8&output=gplain>.

e=Security, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>.

MyNetWatchman.com web pages indicating 9/00 beta release [online]. MyNetWatchman.com [retrieved Apr. 18, 2003]. Retrieved from the Internet: <URL: http://www.mynetwatchman.com/mynetwatchman/relnotes.htm>.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"The need to control, inspect and manage encrypted webtraffic." [online]. Retrieved on Mar. 18, 2005. Retrieved from the Internet: <URL: http://www.microdasys.com/scipproduct+M54a708de802.html>. Author unknown, 2 pages, Czech Republic.

Microdasys, "S C I P Secured Content Inspection: Protecting the Enterprise from CryptoHacks," 2003 by Microdasys Inc., 2 pages, Czech Republic.

Marketing, "Digital Certificates—Best Practices—A Microdasys Whitepaper," bestpractice.doc, Revision 1.1 (Jul. 31, 2003), 6 pages, Czech Republic.

Network Computing Solutions—"Microdasys SCIP" [online]. Retrieved on Mar. 18, 2005. Retrieved from the Internet: <URL: http://www.ncs/cz/index.php?language=en&menuitem-4&subitem=13>, 2 pages, Czech Republic.

Network Computing Solutions—NSC Homepage—News [online]. Retrieved on Mar. 18, 2005 . Retrieved from the Internet: <URL: http://www.nsc.cz/index.php?language=en&menuitem=0&subitem=4&subitem=13>, 3 pages, Czech Republic.

"SSL Stripper Installation Guide," [online]. Retrieved in Mar. 2005 from the Internet: <URL: http://www.sslstripper.com>, 2 pages, U.S.A.

SSL Stripper Home Page, "Security Solutions: SSL Stripper," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "Security Solutions: Sample Screenshots," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "Full feature set," [online]. Retrieved on Mar. 18, 2005. Retrieved from the Internet: <URL: http://www.webwasher.com/enterprise/products/webwasher_products/ssl_scanner/full_feature_set..html?l...>, 2 pages.

Webwasher AG/Webwasher 1000 CSM Appliance, "Webwasher 1000 CSM Appliance," [online]. Retrieved on Mar. 18, 2005. Retrieved from the Internet: <URL: http://www.webwasher.com/enterprise/products/webwasher_products/csm_appliance/index...> 2 pages.

Webwasher AG/Webwasher URL Filter, "Webwasher URL Filter," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "Webwasher Anti Virus," [online]. Retrieved on Mar. 18, 2005. Retrieved from the Internet: <URL: http://www.webwasher.com/enterprise/products/webwasher_products/anti_virus/index.html...>, 2 pages.

Webwasher AG/Webwasher Anti Spam, "Webwasher Anti Spam," [online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "Webwasher Content Protection," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "Webwasher SSL Scanner," [online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "CyberGuard and Webwasher: The Value Proposition," A CyberGuard Corporation White Paper, May 2004, 6 pages.

* cited by examiner

USING INSERTED E-MAIL HEADERS TO ENFORCE A SECURITY POLICY

TECHNICAL FIELD

This invention pertains generally to computer security, and more specifically to using inserted e-mail headers to enforce a security policy.

BACKGROUND ART

Networked computers are vulnerable to malicious computer code attacks, such as worms, viruses and Trojan horses. As used herein, "malicious computer code" is any code that enters a computer without an authorized user's knowledge and/or without an authorized user's consent.

More specifically, e-mail worms are a growing plague on today's Internet users. As evidenced by the success of recent worms such as MyDoom, current solutions do not always adequately contain such threats.

Much current anti-malicious code software scans executable images looking for known malicious code signatures. Many users of security software do not keep up to date with respect to their anti-malicious code product and its signatures. In any case, signatures do not exist for newly released worms until they have been identified and analyzed. Therefore, even the subset of security software subscribers who are up to date with respect to their anti-malicious code product and its signatures would benefit from technology that protects them during the period between threat appearance and signature delivery.

What is needed are methods, systems and computer readable media that provide protection from malicious code from its onset through and beyond the production of traditional signatures for anti-malicious code products. Additionally, it would be desirable for the methods, systems and computer readable media to identify worm originating source processes, and to generate network scalable warnings thereof.

DISCLOSURE OF INVENTION

Some embodiments of the present invention comprise methods, systems, and computer readable media for enforcing an e-mail security policy. An outgoing e-mail manager associated with a computer inserts headers into outgoing e-mail messages originating from at least one source on the computer. Each header includes data concerning the source of the e-mail, such as the name of the source, a hash of the source, the size of the source, etc. An e-mail header manager associated with a computer monitors an e-mail stream, and reads headers inserted into e-mail messages. The e-mail header manager applies a security policy to e-mail messages, responsive to the contents of the inserted headers. In some embodiments, the e-mail header manager tabulates statistics concerning e-mail sources from the contents of inserted headers, and utilizes these tabulated statistics to determine trust levels for each source.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
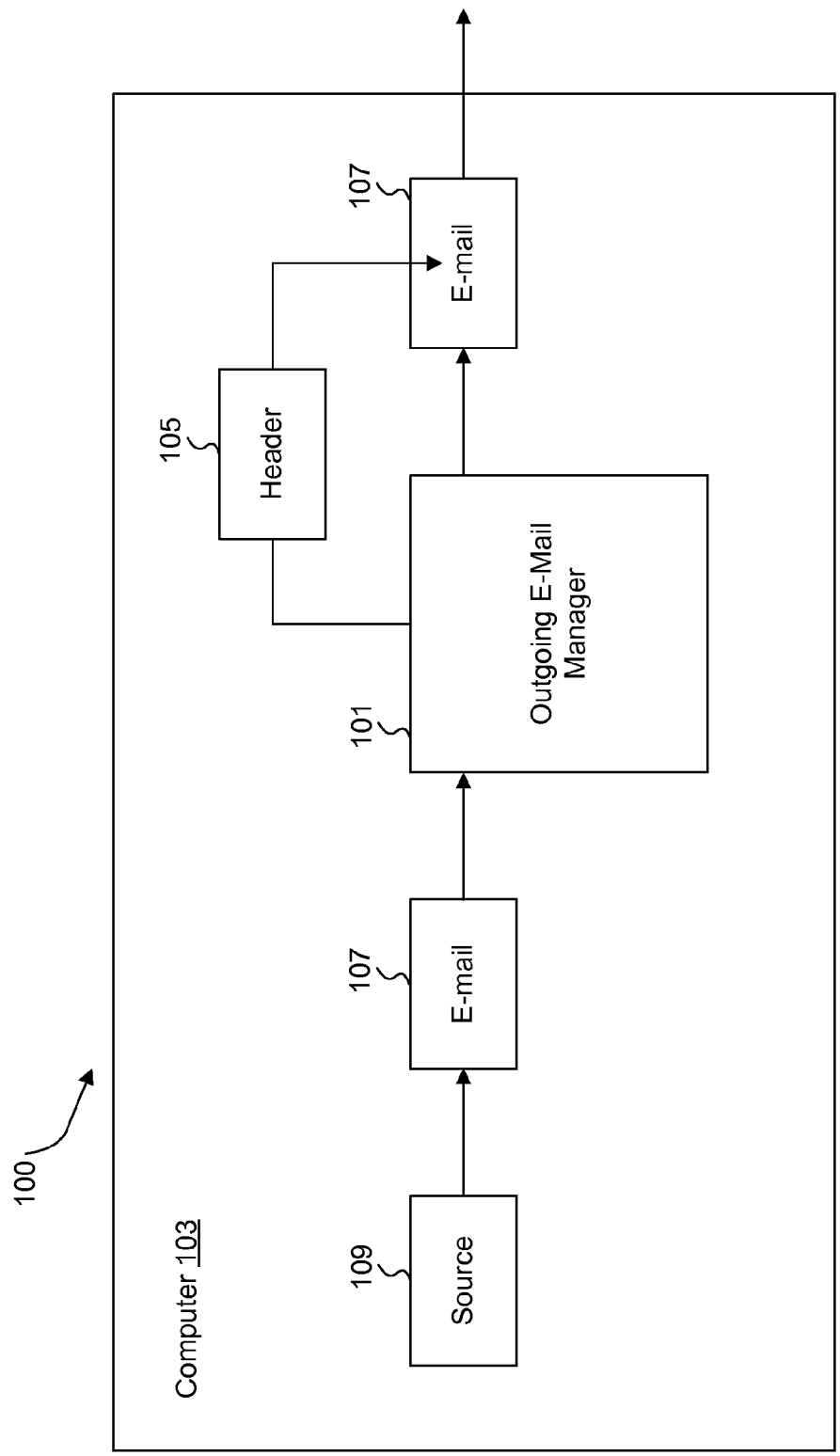
FIG. 1 is a block diagram illustrating a high level overview of inserting headers into e-mails, according to embodiments of the present invention.

FIG. 1 illustrates a high level overview of a system 100 for performing some embodiments of the present invention. An outgoing e-mail manager 101 runs in a computer 103. It is to be understood that although the outgoing e-mail manager 101 is illustrated as a single entity, as the term is used herein an outgoing e-mail manager 101 refers to a collection of functionalities which can be implemented as software, hardware, firmware or any combination of the three. Where an outgoing e-mail manager 101 is implemented as software, it can be implemented as a standalone program, but can also be implemented in other ways, for example as part of a larger program, as a plurality of separate programs, or as one or more statically or dynamically linked libraries.

In some embodiments, the outgoing e-mail manager 101 is instantiated in the form of an e-mail proxy (not illustrated), running on the computer 103. Through its omnipresent monitoring of e-mail 107 traffic, an e-mail proxy is in a unique position for specialized e-mail 107 monitoring. The implementation mechanics of e-mail proxies are known to those of ordinary skill in the relevant art. In other embodiments, the outgoing e-mail manager 101 can be instantiated in others forms, on or otherwise associated with the computer 103 (e.g., as a scanning program on the computer 103, on a gateway or switch, etc.).

As illustrated in FIG. 1, the outgoing e-mail manager 101 harmlessly inserts headers 105 into outgoing e-mail messages 107, the headers 105 including information about the source 109 of the e-mail messages 107. Such information can them be used to track, stop, and profile e-mail worm outbreaks, as described below in conjunction with FIG. 2.

These headers 105 can contain identifying markers of the sending programs (sources 109) of the e-mails 107, such as the name of the sending program 109, a hash of the sending program 109, the size of the sending program 109, the last modification date or the installation date of the sending program 109, etc. The outgoing e-mail manager 101 can also include data such as activity information concerning the source program 109 and/or a hash of at least a portion the e-mail message 107 itself. The specific content of the headers 105 is a variable design choice.

In some embodiments, the outgoing e-mail manager 101 obfuscates the headers 105, for example by using a known encryption technique. This raises the bar for a malicious program to forge headers 105. In some embodiments, the outgoing e-mail manager 101 checks to see if another program has already inserted a header 105 in an outgoing e-mail 107. This would typically indicate that the already inserted header 105 is forged, and that thus the outgoing e-mail 107 is not legitimate. The presence of a forged header 105 can also be used to identify malicious code by a recipient, as described below.

The outgoing e-mail manager 101 can insert the headers 105 into the outgoing e-mail messages 107 by, for example, injecting them into the Simple Mail Transfer Protocol ("SMTP") sending stream. Of course, the present invention is not limited to SMTP, and can be applied to other e-mail protocols as well, such as Microsoft's Hotmail Hypertext Transfer E-mail Protocol. The implementation mechanics of inserting the headers 105 into outgoing e-mails 105 will be readily apparent to one of ordinary skill in the relevant art in light of this specification.

Figure 2:
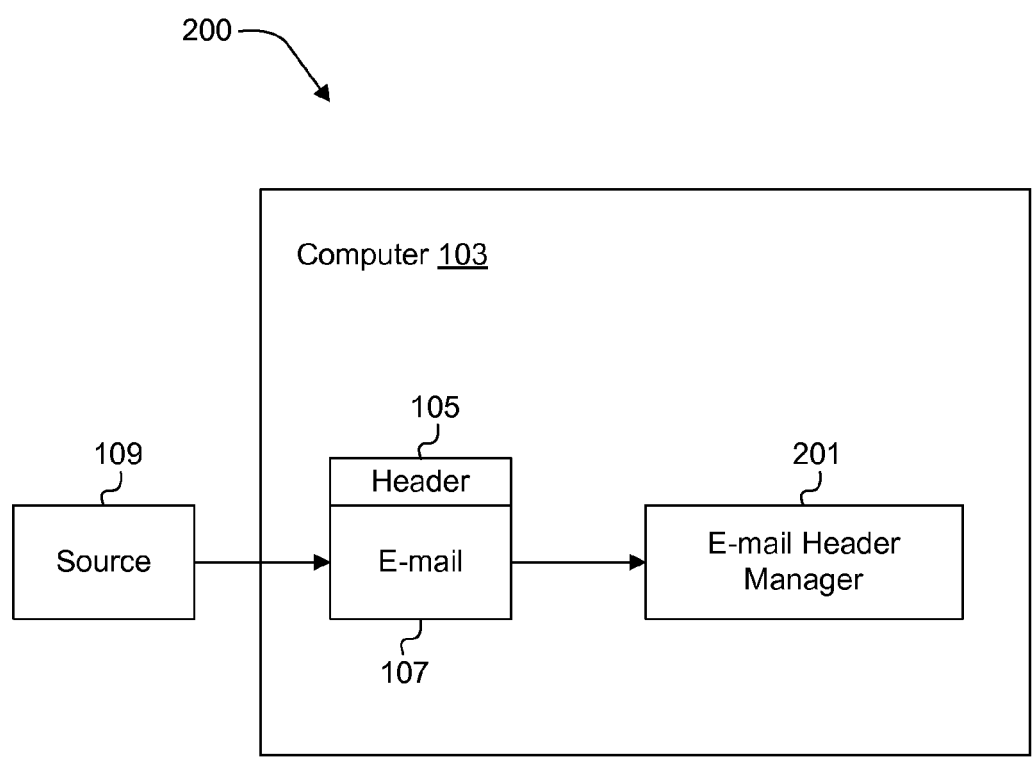
FIG. 2 is a block diagram illustrating a high level overview of processing inserted e-mail headers, according to other embodiments of the present invention.

Turning now to FIG. 2, there is illustrated a high level overview of a system 200 for practicing other embodiments of the present invention. An e-mail header manager 201 runs in a computer 103. It is to be understood that although the e-mail header manager 201 is illustrated as a single entity, as the term is used herein an e-mail header manager 201 refers to a collection of functionalities which can be implemented as software, hardware, firmware or any combination of the three. Where an e-mail header manager 201 is implemented as software, it can be implemented as a standalone program, but can also be implemented in other ways, for example as part of a larger program, as a plurality of separate programs, or as one or more statically or dynamically linked libraries.

It is to be understood that the e-mail header manager 201 can run on a client computer 103, an e-mail server, and/or on a network computing device such as a router or a switch. Although FIG. 2 illustrates an e-mail header manager 201 processing incoming e-mail 107, of course an e-mail header manager 201 can also process outgoing e-mail 107 and apply a security policy thereto as desired. In some embodiments, the outgoing e-mail manager 101 and the e-mail header manager 201 are instantiated as a single program which performs both outgoing e-mail 107 processing as described above, and e-mail header 105 detection and processing as described below. In some embodiments of the present invention, the e-mail header manager 201 is instantiated as an add on to an existing mail transfer agent. In other embodiments, the e-mail header manager 201 can be instantiated in others forms, on or otherwise associated with the computer 103 (e.g., as a standalone program on the computer 103, on a gateway or switch, etc.).

The e-mail header manager 201 monitors an e-mail 107 stream, and reads the headers 105 inserted therein by outgoing mail managers 101. Based on the information in the headers 105, the e-mail header manager 201 can apply a security policy to the e-mail 107 as desired. It is to be understood that the specific security policy to apply is a variable design choice, and there exist a wide variety of possibilities, in terms of what to monitor in the headers 105, and how to process e-mails 107 whose inserted headers 105 contain data of interest.

For example, most legitimate e-mail 107 is typically sent by a small number of e-mail clients. The hash values of the most common e-mail clients (optionally, combined with their names, sizes, and/or other characteristics) can be identified by the e-mail header manager 201. Thus, by comparing information in a header 105 identifying the source 109 of the associated e-mail 107, the e-mail header manager 201 can determine whether the e-mail 107 originated from a legitimate source 109, and allow it through, note that it is suspicious and process it further, or block it accordingly.

Of course, according to some security policies, just appearing to originate from a legitimate e-mail client is not necessarily enough to adjudicate an e-mail 107 as being legitimate. Malicious programs can also identify (and thus mimic) characteristics concerning legitimate e-mail clients, so some security policies will look at other factors, such as the frequency of e-mails 107 originating from the source 109 and/or a change in that frequency, as well as how long the source 109 has been operational. E-mail worms typically appear suddenly and proceed to send themselves to many destinations as quickly as possible. Thus, a new source 109 suddenly sending a lot of e-mails 107 can be cause for suspicion. The e-mail header manager 201 can detect a new source 109 of large quantities of e-mails 107 by monitoring the appropriate data in the inserted headers 105. The e-mail header manager 201 can also monitor changes in the frequency of e-mails 107 sent by specific clients.

Another factor that can be of interest is a comparison of the hash of the source 109 with the hash of the contents (or a portion thereof) of the e-mail 107 (e.g., the contents of an attachment or some or all of the body of the e-mail 107 itself). Worms typically duplicate themselves, so these hash values being identical or substantially similar (e.g., at least the same name, size, etc.) can be an indication of an e-mail worm.

Of course, in other embodiments, the e-mail header manager 201 determines that a source 109 is non-legitimate or suspicious based on other factors, for example the detection of a forged header 105.

In different embodiments of the present invention, the e-mail header manager 201 can respond in various ways to detection of e-mail 107 from a suspicious or non-legitimate source 109, as specified by a security policy. For example, responsive to determining that a source 109 is non-legitimate, the e-mail header manager 201 can block e-mails 107 originating from that source 109. For example, once it is known that a particular program, identified by the information in the headers 105, is sending malicious e-mail 107, the e-mail header manager 201 can simply remove undelivered e-mail 107 from that program. The implementation mechanics of identifying and deleting undelivered e-mail 107 from a sending program are known to those of ordinary skill in the relevant art.

In some embodiments, responsive to determining that a source 109 is non-legitimate or suspicious, the e-mail header manager 201 transmits an appropriate warning concerning the source 109 to at least one other computer 103 on the network, for example to a security server.

In other embodiments, responsive to determining that a source 109 is suspicious, the e-mail header manager 201 performs a heuristic analysis of the source 109, in order to determine whether the source 109 is malicious. The e-mail header manager 201 can use the suspicion level concerning the source 109 as a factor in the heuristic analysis.

Figure 3:
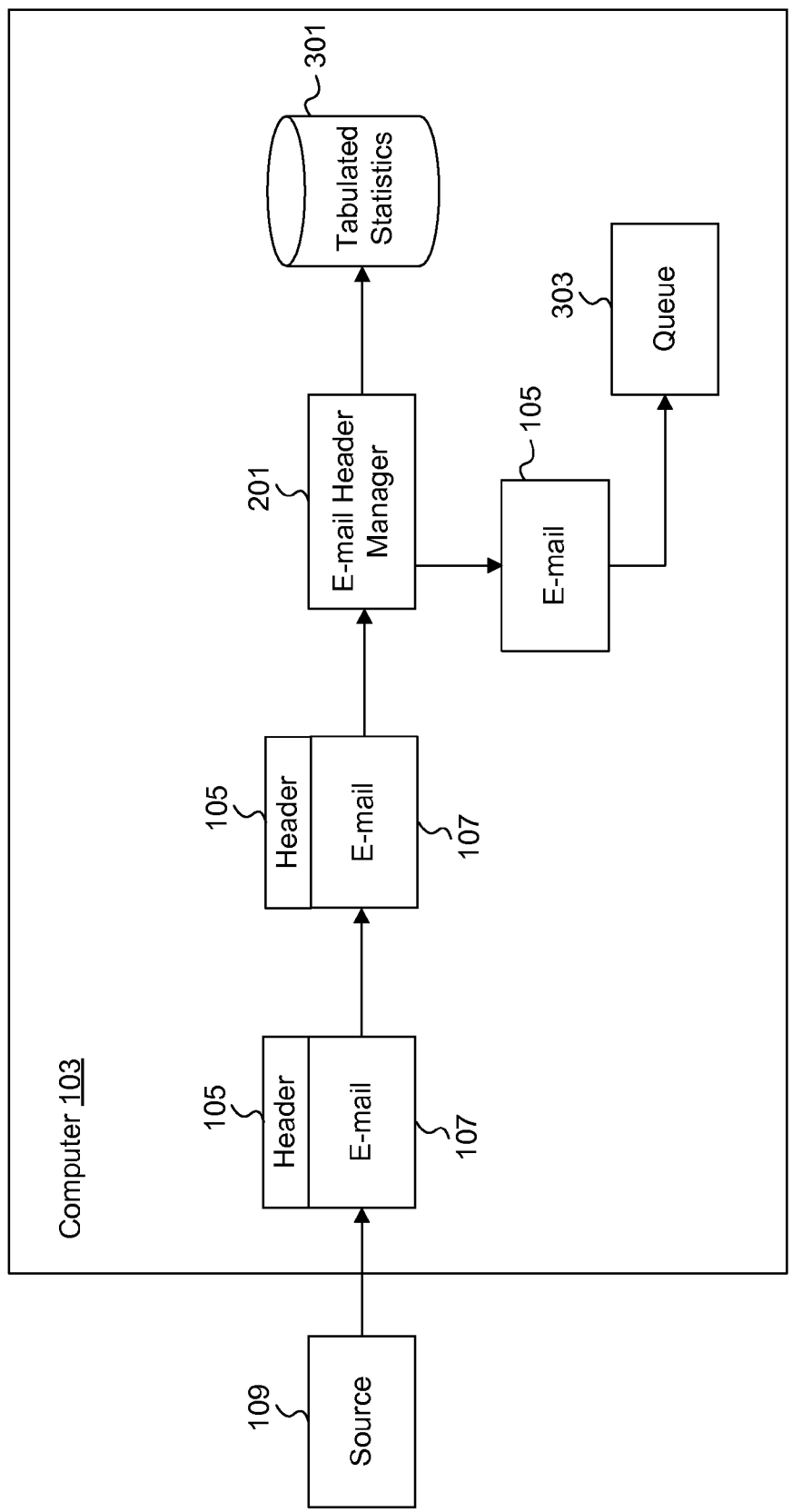
FIG. 3 is a block diagram illustrating a high level overview of processing inserted e-mail headers, according to yet other embodiments of the present invention.

As illustrated in FIG. 3, in some embodiments of the present invention the e-mail header manager 201 can tabulate statistics 301 concerning a source 109 from reading headers 105 inserted into multiple e-mail messages 107 originating from that source 109. The e-mail header manager 201 can then use these tabulated statistics 301 to determine whether the source 109 is legitimate, suspicious or non-legitimate. By examining statistics 301 tabulated over time, the e-mail header manager 201 can observe things such as changes in the frequency of the e-mails 107 transmitted from the source 109.

In some embodiments, the e-mail header manager 201 utilizes tabulated statistics 301 to determine a trust level concerning each source 109. In such embodiments, if a source 109 is fully trusted (i.e., determined to be legitimate) typically it will be allowed to send e-mail 107 without restriction. If a source 109 has been determined to be non-legitimate, typically its e-mail 107 will be blocked altogether. However, as illustrated in FIG. 3, in some embodiments the e-mail header manager 201 can delay the delivery of e-mails 107 originating from sources 109 of varying levels of suspicion for algorithmically determined periods of time (e.g., by holding the e-mails 107 in a variable length queue 303). Optionally, the e-mail header manager 201 can also exchange information about the identified sources 109 and their corresponding queue 303 lengths with other computers 103 on the network, for example through a centralized queryable database (not illustrated).

This type of processing can be performed by an e-mail header manager 201 implemented on the client side (e.g., within or as an extension to an existing transparent SMTP and/or POP3 proxy) or on the server side (e.g., as a stand-alone mail transfer agent ("MTA"), mail server, or as a plug-in to an MTA).

Regardless of its location, the e-mail header manager 201 can track sources 109 of e-mail 107, and monitor the number and rate of e-mails 107 being sent therefrom. A queue 303 can be established for each identified source 109. In other embodiments, a holding mechanism other than a queue 303 is implemented, for example a centralized database of established sources 109 that can be created and queried.

In one embodiment, all new sources 109 are adjudicated to be suspicious. As the number of e-mails 107 sent by a new source 109 increases (but only at a configurable and relatively small rate of, for example, ten e-mails 107 per hour), the source 109 can become "trusted." A newly appearing source 109 that only and/or consistently transmits e-mails 107 at a high rate will typically remain non-trusted.

The more non-trusted a source 109 is, the longer its e-mail 107 is queued for, and thus the longer its queue 303 becomes. At some configurable point, as a function of mail quantity and rate behavior, the algorithm will consider a source 109 trusted and its e-mail will not be queued. In fact, the length of the corresponding queue 303 is inversely related to the trust level of the source 109, which determines the length of time for which its e-mail 107 is queued. Similarly, configurable parameters to the algorithm can be used to determine when a given source 109 becomes completely non-trusted; if it immediately starts sending at a high rate which never drops below normal, for example, it can quickly become completely non-trusted.

It will be understood by those of ordinary skill in the relevant art that the above described security policy serves as an example only. Which factors in headers 105 to use to determine the legitimacy of sources 109 of e-mail 107, which statistics 301 concerning sources 109 to tabulate, how to determine trust levels of sources 109, and how to process e-mails 107 originating from various sources 109, are all design variations of the present invention.

As described above, the present invention can be used within a distributed and/or cooperative computing model whereby nodes (be they clients or servers) share information about identified sources 109 and/or their corresponding tabulated statistics 301 (e.g., their e-mail 107 transmission rates, etc.), for example via a common, queryable database.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for enforcing an e-mail security policy, the method comprising the steps of:
   an e-mail header manager associated with a computer monitoring e-mail;
   the e-mail header manager reading a header inserted into an e-mail message from a source, the header including at least one identifying marker of a sending program used to send the e-mail message; and
   the e-mail header manager applying a security policy to the e-mail message, responsive to at least a determination of whether the identifying marker included in the inserted header indicates that contents of the e-mail message are similar to the sending program.

2. The method of claim 1 further comprising, responsive to at least contents of the inserted header, the e-mail header manager performing a step from a group of steps consisting of:
   determining that the source of the e-mail is legitimate;
   determining that the source of the e-mail is suspicious; and
   determining that the source of the e-mail is non-legitimate.

3. The method of claim 2 further comprising:
   the e-mail header manager determining that a source is non-legitimate based on at least the contents of the e-mail being similar to the sending program.

4. The method of claim 3 further comprising:
   responsive to determining that a source is non-legitimate, the e-mail header manager blocking e-mails originating from the source.

5. The method of claim 3 further comprising:
   responsive to determining that a source is non-legitimate, the e-mail header manager transmitting warning information concerning the source to at least one other computer.

6. The method of claim 2 further comprising:
   the e-mail header manager determining that a source is suspicious based on the contents of the e-mail being similar to the sending program.

7. The method of claim 6 further comprising:
   responsive to determining that a source is suspicious, the e-mail header manager transmitting warning information concerning the source to at least one other computer.

8. The method of claim 6 further comprising:
   responsive to determining that a source is suspicious, the e-mail header manager performing a heuristic analysis of the source.

9. The method of claim 8 further comprising:
the e-mail header manager utilizing the suspicion concerning the source as a factor in the heuristic analysis.

10. The method of claim 1 further comprising:
the e-mail header manager reading headers inserted into multiple e-mail messages originating from at least one source;
the e-mail header manager tabulating statistics concerning at least one source from identifying markers of sending programs included in the inserted headers; and
the e-mail header manager utilizing tabulated statistics to determine a trust level concerning each source.

11. The method of claim 10 further comprising:
the e-mail header manager holding e-mail messages received from a source for a period of time proportional to the corresponding trust level.

12. The method of claim 11 wherein:
the e-mail header manager holds e-mail messages from a source in a corresponding variable length queue for a period of time proportional to the corresponding trust level.

13. The method of claim 10 further comprising:
the e-mail header manager receiving at least one additional e-mail message from a source;
the e-mail header manager updating the tabulated statistics concerning that source; and
the e-mail header manager updating the trust level concerning that source.

14. The method of claim 10 further comprising:
the e-mail header manager transmitting information concerning a trust level concerning at least one source to at least one other computer.

15. A computer implemented method for enforcing an e-mail security policy, the method comprising the steps of:
an outgoing e-mail manager associated with a computer inserting headers into outgoing e-mail messages originating from at least one source on the computer, the source including a sending program used to send the e-mail messages, each header including at least one identifying marker of the sending program from a group of identifying markers consisting of:
a size of the sending program;
a hash of the sending program;
an installation date of the sending program; and
a modification date of the sending program.

16. The method of claim 15 further comprising:
the outgoing e-mail manager obfuscating the inserted headers.

17. The method of claim 15 further comprising:
the outgoing e-mail manager detecting an already inserted header in an outgoing e-mail message; and
the outgoing e-mail manager performing a step from a group of steps consisting of:
determining that the sending program is suspicious; and
determining that the sending program is non-legitimate.

18. A computer readable storage medium containing an executable computer program product for enforcing an e-mail security policy, the computer program product comprising:
program code for monitoring e-mail;
program code for reading a header inserted into an e-mail message from a source, the header including at least one identifying marker of a sending program used to send the e-mail message; and
program code for applying a security policy to the e-mail message, responsive to at least a determination of whether the identifying marker included in the inserted header indicates that contents of the e-mail message are similar to the sending program.

19. The computer program product of claim 18 further comprising program code for, responsive to at least contents of the inserted header, performing a step from a group of steps consisting of:
determining that the source of the e-mail is legitimate;
determining that the source of the e-mail is suspicious; and
determining that the source of the e-mail is non-legitimate.

20. The computer program product of claim 18 further comprising:
program code for reading headers inserted into multiple e-mail messages originating from at least one source;
program code for tabulating statistics concerning at least one source from identifying markers of sending programs included in the inserted headers; and
program code for utilizing tabulated statistics to determine a trust level concerning each source.

21. The computer program product of claim 20 further comprising:
program code for holding e-mail messages received from a source for a period of time proportional to the corresponding trust level.

22. The computer program product of claim 20 further comprising:
program code for receiving at least one additional e-mail message from a source;
program code for updating the tabulated statistics concerning that source; and
program code for updating the trust level concerning that source.

23. The computer program product of claim 20 further comprising:
program code for transmitting information concerning a trust level concerning at least one source to at least one other computer.

24. A computer readable storage medium containing an executable computer program product for enforcing an e-mail security policy, the computer program product comprising:
program code for inserting headers into outgoing e-mail messages originating from at least one source on the computer, the source including a sending program used to send the e-mail messages, each header including at least one identifying marker of the sending program from a group of identifying markers consisting of:
a size of the sending program;
a hash of the sending program;
an installation date of the sending program; and
a modification date of the sending program.

25. The computer program product of claim 24 further comprising:
program code for obfuscating the inserted headers.

26. The computer program product of claim 24 further comprising:
program code for detecting an already inserted header in an outgoing e-mail message; and
program code for performing a step from a group of steps consisting of:
determining that the source of the e-mail is suspicious; and
determining that the source of the e-mail is non-legitimate.

27. A computer system for enforcing an e-mail security policy, the computer system comprising:
a computer readable storage medium containing an executable computer program product comprising:

a software portion configured to monitor e-mail;

a software portion configured to read a header inserted into an e-mail message from a source, the header including at least one identifying marker of a sending program used to send the e-mail message; and a software portion configured to apply a security policy to the e-mail message, responsive to at least a determination of whether the identifying marker included in the inserted header indicates that contents of the e-mail message are similar to the sending program.

28. The computer system of claim 27 further comprising a software portion configured to, responsive to at least contents of the inserted header, perform a step from a group of steps consisting of:

determining that the source of the e-mail is legitimate;
determining that the source of the e-mail is suspicious; and
determining that the source of the e-mail is non-legitimate.

29. The computer system of claim 27 further comprising:

a software portion configured to read headers inserted into multiple e-mail messages originating from at least one source;

a software portion configured to tabulate statistics concerning at least one source from identifying markers of sending programs included in the inserted headers; and a software portion configured to utilize tabulated statistics to determine a trust level concerning each source.

30. The computer system of claim 29 further comprising:

a software portion configured to hold e-mail messages received from a source for a period of time proportional to the corresponding trust level.

31. The computer system of claim 29 further comprising:

a software portion configured to receive at least one additional e-mail message from a source;

a software portion configured to update the tabulated statistics concerning that source; and a software portion configured to update the trust level concerning that source.

32. The computer system of claim 29 further comprising:

a software portion configured to transmit information concerning a trust level concerning at least one source to at least one other computer.

33. A computer system for enforcing an e-mail security policy, the computer system comprising:

a computer readable storage medium containing an executable computer program product comprising:

a software portion configured to insert headers into outgoing e-mail messages originating from at least one source on the computer, the source including a sending program used to send the e-mail messages, each header including at least one identifying marker of the sending program from a group of identifying markers consisting of:

a size of the sending program;
a hash of the sending program;
an installation date of the sending program; and
a modification date of the sending program.

34. The computer system of claim 33 further comprising:

a software portion configured to obfuscate the inserted headers.

35. The computer system of claim 33 further comprising:

a software portion configured to detect an already inserted header in an outgoing e-mail message; and a software portion configured to perform a step from a group of steps consisting of:

determining that the source of the e-mail is suspicious; and determining that the source of the e-mail is non-legitimate.

* * * * *